(12) United States Patent
Kagotani et al.

(10) Patent No.: US 7,192,676 B2
(45) Date of Patent: Mar. 20, 2007

(54) MAGNETO-RESISTANCE EFFECT ELEMENT BAR EXPOSURE METHOD

(75) Inventors: Tsuneo Kagotani, deceased, late of Chuo-ku (JP); by Teruyo Kagotani, legal representative, Saku (JP); Hitoshi Hatate, Chuo-ku (JP); Noriaki Kasahara, Chuo-ku (JP); Tetsuya Kuwashima, Chuo-ku (JP)

(73) Assignee: TDK Corporation, Tokyo (JP)

( * ) Notice: Subject to any disclaimer, the term of this patent is extended or adjusted under 35 U.S.C. 154(b) by 523 days.

(21) Appl. No.: 10/643,917

(22) Filed: Aug. 20, 2003

(65) Prior Publication Data
US 2004/0160704 A1 Aug. 19, 2004

(30) Foreign Application Priority Data
Aug. 30, 2002 (JP) ............................. 2002-256110

(51) Int. Cl.
*G11B 5/39* (2006.01)
(52) U.S. Cl. .................. 430/22; 430/296; 430/319; 430/320
(58) Field of Classification Search ...................... None
See application file for complete search history.

(56) References Cited

U.S. PATENT DOCUMENTS 6,003,223 A * 12/1999 Hagen et al. ............ 29/603.12
2002/0013996 A1 * 2/2002 Okada et al. ............ 29/603.16

FOREIGN PATENT DOCUMENTS

JP A-2002-56514 2/2002

* cited by examiner

*Primary Examiner*—John A McPherson
(74) *Attorney, Agent, or Firm*—Oliff & Berridge, PLC (57) ABSTRACT

The present invention provides an MR element bar that permits the fabrication of MR elements in which a variation in characteristics is suppressed, as well as an MR element bar exposure method and formation method enabling the fabrication of the MR element bar. The MR element bar exposure method according to the present invention comprises the steps of: detecting the positions of a plurality of alignment marks $P_1$ to $P_4$ formed on a wafer W; correcting an exposure position correction region R on the basis of the positions of detected alignment marks $P_1'$ to $P_4'$; and exposing a resist which is formed on the wafer W, wherein an MR element bar region B comprises a plurality of MR elements (patterns MRE) aligned in the longitudinal direction of the region B, and one exposure position correction region R is established for one MR element bar region B.

5 Claims, 5 Drawing Sheets

MAGNETO-RESISTANCE EFFECT ELEMENT BAR EXPOSURE METHOD

BACKGROUND OF THE INVENTION

1. Field of the Invention

The present invention relates to a magneto-resistance effect element bar exposure method, a magneto-resistance effect element bar formation method, and a magneto-resistance effect element bar.

2. Related Background Art

The increased capacity and miniaturization of magnetic disk devices as well as the higher recording densities thereof have established a need for improvements in the performance of thin-film magnetic heads.

The creation of a thin-film magnetic head involves first cutting a magneto-resistance effect element bar that comprises several tens to several hundreds of magneto-resistance effect elements (referred to hereinafter as MR elements) which are lined up in a row in the longitudinal direction of the bar, from a substrate. The cut faces parallel to the longitudinal direction are then polished to obtain an MR element bar that comprises MR elements that possess the desired MR element height, that is, a length ('MR height' hereinafter) which extends from the polished face-side end of the MR element as far as the end on the opposite side, the MR elements being processed separately to form thin-film magnetic heads.

Although the MR elements in the MR element bar are ideally lined up at equal intervals on a straight line, the MR elements are, in actual fact, lined up in positions which are somewhat displaced from the positions originally intended. Further, although several tens to several hundreds of MR elements in this single MR element bar are then polished under conditions which are thought to be optimum, when the positions of each of the MR elements are widely different, much less discontinuous, the distribution of the desired MR height is then poor, and the distribution of the element resistance of the MR elements and the MR rate of change is poor. As a result, a variation in the thin-film magnetic head characteristics is produced and hence the yield is poor.

SUMMARY OF THE INVENTION

The present invention was conceived in view of the above problems and has, as an object, the provision of an MR element bar that permits the fabrication of MR elements in which a variation in characteristics is suppressed, as well as an MR element bar exposure method and formation method enabling the fabrication of the MR element bar.

In order to achieve the above object, the MR element bar exposure method according to the present invention is an MR element bar exposure method that comprises the steps of detecting the positions of a plurality of alignment marks formed on a substrate, correcting an exposure position correction region on the basis of the positions of the detected alignment marks, and exposing a resist that is coated on the substrate, wherein an MR element bar region comprises a plurality of magneto-resistance effect elements arranged in the longitudinal direction of the bar region; and one exposure position correction region is established for one MR element bar region.

Although the positions of the MR elements are determined by the resist exposure points, when the exposure position correction region that serves as a reference for prescribing the exposure point positions is established in a quantity of two or more for one bar region, because the reference for prescribing the exposure point positions is different for each of the exposure position correction regions in the MR element bar, correction is performed such that MR elements are then positioned on straight lines and curved lines and so forth which differ. As a result, because there is a variation in the average value and distribution of the position coordinates of the MR elements in the correction regions in a direction perpendicular to the cut faces, the distribution of the MR height within the MR element bar is poor.

Because, according to the present invention, one exposure position correction region is established for one MR element bar region, there is a single reference for prescribing the exposure point positions, and therefore the distribution of the MR height within the MR element bar is favorable.

Ideally, according to the MR element bar exposure method, one MR element bar region preferably does not straddle the boundary of the exposure position correction region, and, in this case, the position of the whole region of the MR element bar can be corrected by means of a single reference.

Further, when the exposure is electron beam exposure, because exposure can be performed at a high resolution, MR elements of a small size corresponding to a high recording density can be made.

The MR element bar formation method according to the present invention comprises the steps of: developing a resist exposed by means of the above-mentioned MR element bar exposure method; forming a magneto-resistance effect element pattern by using a mask constituted by the developed resist; cutting the MR element bar from the substrate; and polishing the cut faces parallel to the longitudinal direction of the MR element bar.

In this case, because the position of the whole region of the MR element bar is corrected by means of a single reference, the MR height following polishing of the cut faces parallel to the longitudinal direction is also equalized, whereby a variation in characteristics from one MR element to the next can be suppressed.

Further, the MR element bar which is fabricated by means of this method is an MR element bar that comprises a plurality of magneto-resistance effect elements arranged in the longitudinal direction of the bar, wherein the interval between neighboring magneto-resistance effect elements in the thickness direction of the MR element bar and in a direction perpendicular to the longitudinal direction thereof is equal to or less than 0.05 µm.

Here, because the interval from the parallel faces in the longitudinal direction of the MR element bar to neighboring MR elements is equal to or less than 0.05 µm, the distribution of the MR height is favorable, whereby a variation in characteristics from one MR element to the next can be suppressed.

The control method of the exposure device according to the present invention is a control method for an exposure device that comprises a drive system for shifting a substrate, which is coated with a resist sensitive to beam exposure and from which an MR element bar is cut, in a direction within the substrate plane; a beam exposure source for applying a beam to the substrate; beam shifting means for shifting the beam to the desired position on the substrate; and a control system for controlling the drive system and the beam shifting means, wherein, when the MR element bar is exposed, the control system controls the drive system so that the substrate is shifted only in the longitudinal direction of the MR element bar.

In electron beam exposure, the beam is scanned over the substrate as a result of beam shifting means shifting the beam at the same time the substrate is shifted by the drive system, and a deflector coil that deflects the electron beam to a region of a certain limited size on the substrate may be considered as the beam shifting means. The accuracy with which the beam is positioned by means of the deflection is higher than the accuracy with which the position of the substrate is controlled by the drive system, and hence the range of motion given the same accuracy is small. During exposure by this device, the substrate is not shifted by the drive system in a perpendicular direction, that is, in a direction perpendicular to the longitudinal direction of the MR element bar, and therefore shifting errors in the perpendicular direction made by the drive system are suppressed. Further, the whole surface of the substrate is normally sequentially exposed with the positional accuracy in the perpendicular direction unaffected as a result of the substrate being shifted by the drive system in the perpendicular direction at the exposure end.

DESCRIPTION OF THE PREFERRED EMBODIMENTS

An MR element bar according to an embodiment as well as an exposure method and formation method for this MR element bar will be described below. The same reference numerals have been assigned to the same elements and hence repetition in the description is avoided.

Figure 1:
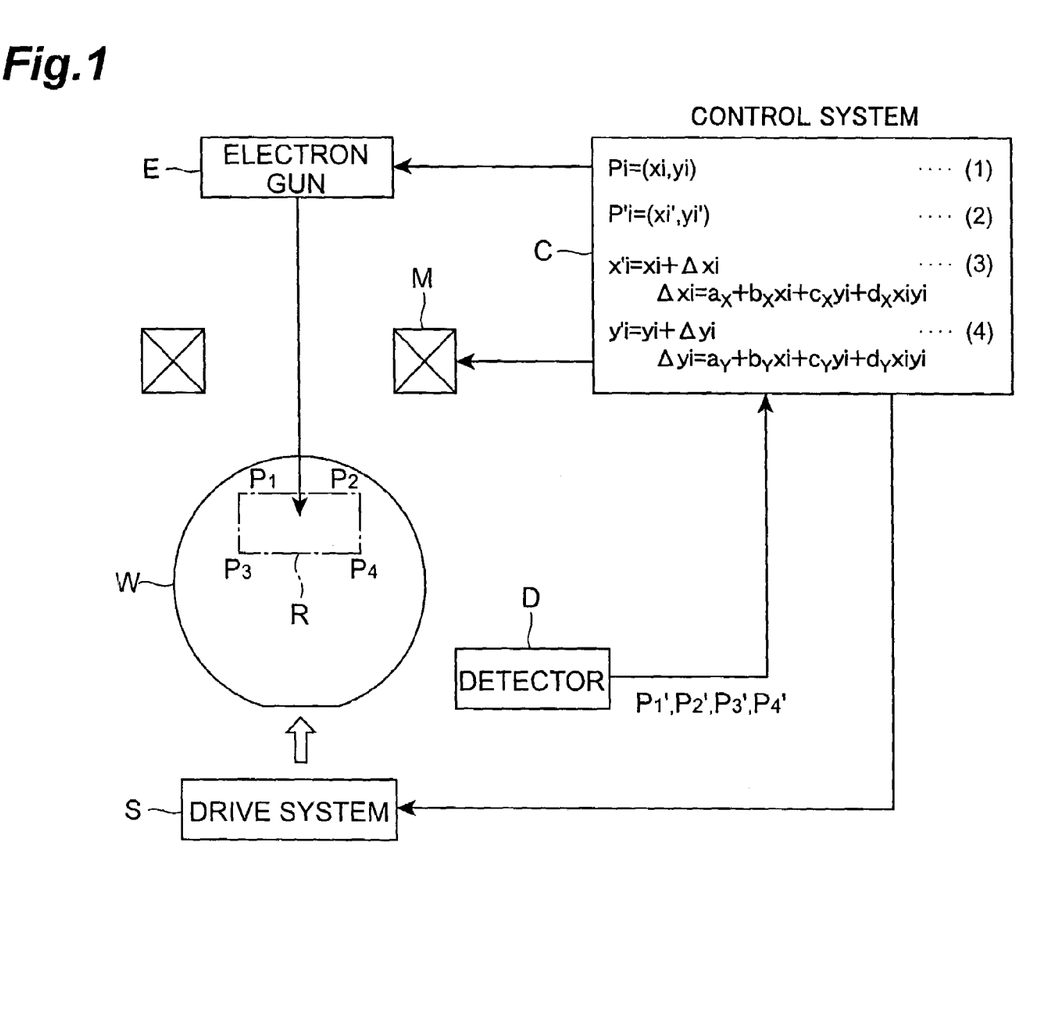
FIG. 1 is a block diagram of the MR element bar exposure device.

FIG. 1 is a block diagram of the MR element bar exposure device.

The exposure device comprises an electron gun (beam exposure source) E for applying an electron beam to an AlTiC wafer (substrate) W; a deflector coil (beam shifting means) M for deflecting the electron beam emitted by the electron gun E; a drive system S on which the wafer W is mounted and which shifts the wafer W in a horizontal direction (within the substrate plane); and a detector D for detecting the position (coordinates) in the horizontal plane of alignment marks $P_1$ to $P_4$ formed on the wafer W. Because the exposure performed using the exposure device is electron beam exposure, exposure can be performed at a high resolution.

The coordinates Pi (i=1,2,3,4) of the alignment marks $P_1$, $P_2$, $P_3$, and $P_4$ which are established as the exposure conditions are inputted to a control system C. In other words, the coordinates of the alignment marks $P_1$, $P_2$, $P_3$, and $P_4$ are given as $P_1(x_1, y_1)$, $P_2(x_2, y_2)$, $P_3(x_3, y_3)$, and $P_4(x_4, y_4)$.

The control system C drives the drive system S so that same is shifted to the alignment marks within the wafer W on the basis of the inputted coordinates for the alignment marks $P_1$ to $P_4$. A beam is then emitted by the electron gun E, and a current is supplied to the deflector coil M such that the beam is scanned in the desired range. Then, secondary electrons or scattered electrons are detected by the detector D such that the actual coordinates $P_1'(x_1', y_1')$ to $P_4'(x_4', y_4')$ of the alignment marks of the wafer W are detected.

The exposure position correction region R which is enclosed by the alignment marks $P_1$ to $P_4$ is thus established on the wafer W. The exposure position correction region R is the region targeted for position correction at the time of exposure. The exposure position correction converts the established alignment mark coordinates P (xi, yi) to the detected actual coordinates (Pi' (xi', yi')) by means of certain transform equations. Although a variety of equations may be considered for these transform equations, the present example employs the numerical formulae (1) to (4) shown in FIG. 1. Further, the coefficients $a_x$, $b_x$, $c_x$, $d_x$, $a_y$, $b_y$, $c_y$, and $d_y$ in the numerical formulae are set so as to minimize the error during the transformation. The position coordinates at which the MR elements are to be exposed are also transformed, that is, corrected, by means of these transform equations.

Figure 2:
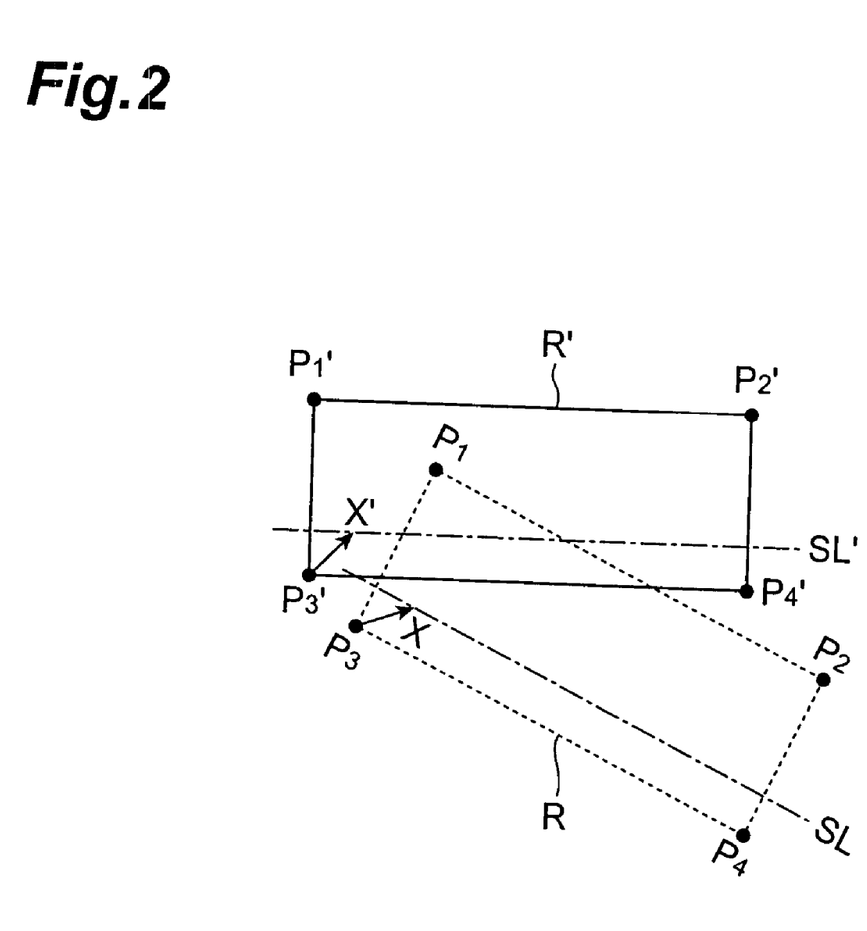
FIG. 2 shows exposure position correction regions R and R' respectively before and after conversion.

FIG. 2 shows exposure position correction regions R and R' respectively before and after conversion.

The detected alignment mark positions are indicated by $P_1'$ to $P_4'$, the transformed beam exposure position is indicated by x', the reference line is indicated by SL', the established alignment mark positions are indicated by $P_1$ to $P_4$, the beam exposure position is indicated by X, and the reference line is indicated by SL.

The exposure position correction region which is based on the positions of the alignment marks $P_1$ to $P_4$ is R, while the exposure position correction region which has undergone a transformation based on the detected actual coordinates for the alignment marks and the established coordinates is R'.

The exposure position correction region R can be shifted to the position of the original exposure position correction region R' by rotating and translating the wafer W within a horizontal plane by means of the drive system S. Here, the coordinate system during electron beam scanning is corrected such that, rather than the wafer W being shifted by the drive system S, the exposure position correction region R is positioned so as to become the exposure position correction region R' which is the equivalent thereof. A secondary coordinate system in the stage of the drive system S accords with the numerical formula (2) (x'-y' coordinate axis) of FIG. 1.

The coordinates of both exposure position correction regions R and R' shown in FIG. 2 satisfy the relationships of the numerical formulae (1) to (4) in FIG. 1, and therefore in a case where the beam is applied at the established position $P_1$, the deflector coil M is controlled such that the beam is applied at the position P1'. Elliptical correction and trapezoidal correction and so forth could also be applied to the transformation of the coordinates of the exposure position.

If the coordinate transformation is applied to points within the established exposure position correction region R, a reference line SL undergoes a coordinate transformation to become the reference line SL' and the beam exposure position X established on the reference line SL is thus shifted to become X'.

In other words, when the electron beam is applied to the reference line SL, the electron beam may be applied to the reference line SL' by controlling the deflector coil M and the drive system S. In this example, the electron beam is applied intermittently while being scanned on the reference line SL' and thus exposure of the electron beam resist formed on the wafer W is performed.

A brief description of the exposure position correction region R will now be provided.

Figure 3A:
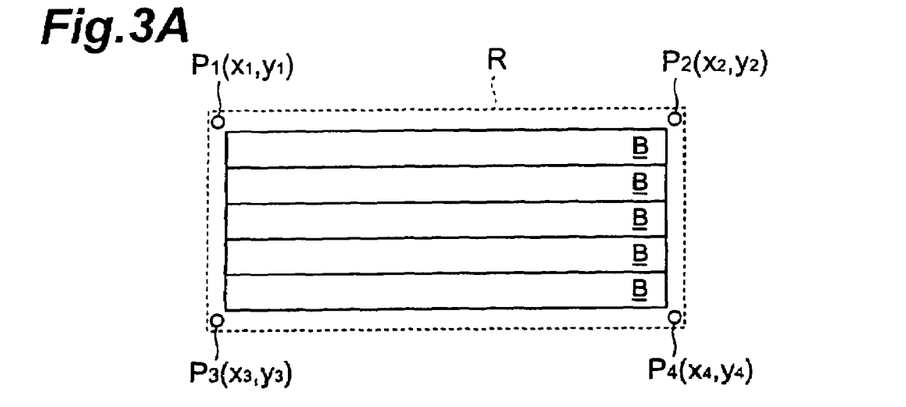
FIG. 3A provides a planar view of the exposure position correction region R according to the present invention.
Figure 3B:
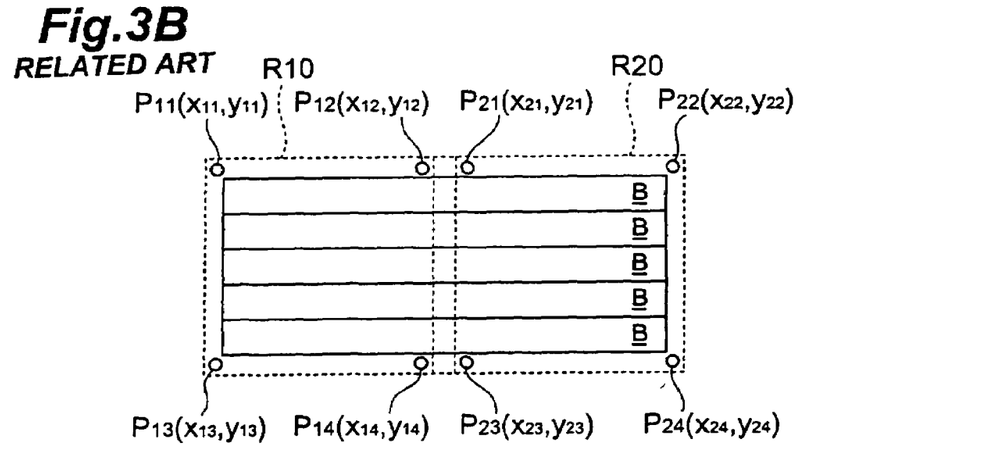
FIG. 3B provides a planar view of exposure position correction regions R10 and R20 according to a conventional example.

FIG. 3A is a planar view of the exposure position correction region R according to the present invention, and FIG. 3B is a planar view of the exposure position correction regions R10 and R20 according to a conventional example.

Figure 3C:
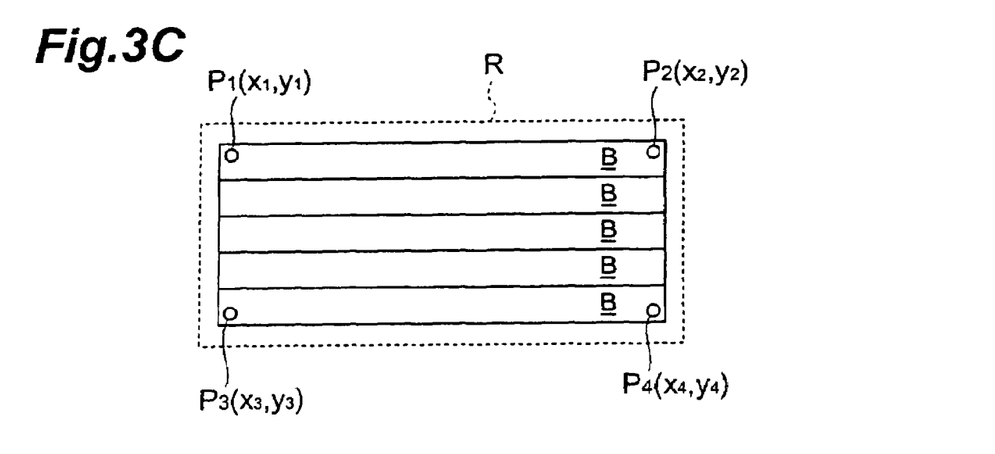
FIG. 3C provides a planar view of the exposure position correction region R according to the present invention.

According to the present invention, although a plurality of MR element bar regions (referred to as 'bar regions' hereinafter) B are shown, consideration of one bar region B reveals that one exposure position correction region R is established for one bar region B. The bar region B is established within the exposure position correction region R so that there is no straddling of the boundary that prescribes the exposure position correction region R. In this case, the whole region of the bar region B can be corrected. Although the exposure position correction region R can be designated without regard to the alignment marks $P_1$ to $P_4$, the alignment marks $P_1$ to $P_4$ are generally arranged within the exposure position correction region R on account of the need to ensure positional accuracy. Further, as shown in FIG. 3C, the alignment marks $P_1$ to $P_4$ may lie within the bar region B. Note that FIG. 3C provides a planar view of the exposure position correction region R according to the present invention.

On the other hand, in the conventional example, two exposure position correction regions R10 and R20 are established for one bar region B. FIG. 3B illustrates the fact that the alignment marks $P_{11}$ to $P_{14}$ and $P_{21}$ to $P_{24}$ lie inside the exposure position correction regions R10 and R20.

Figure 4:
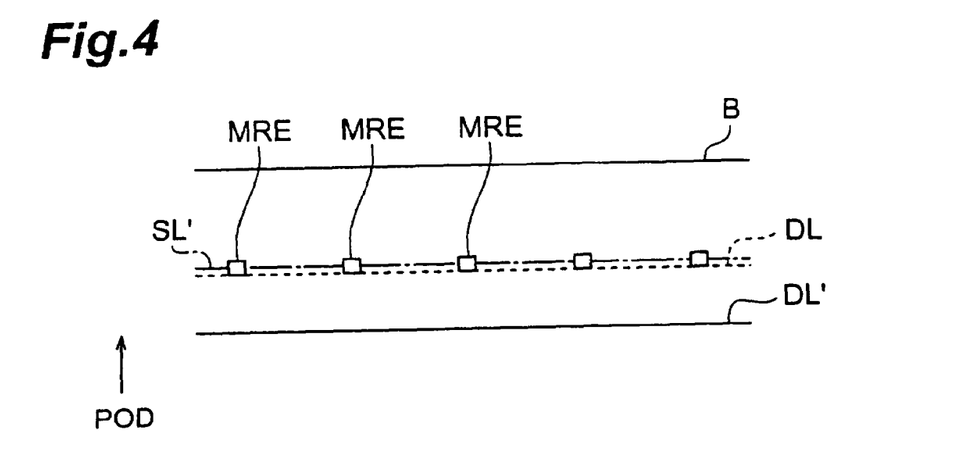
FIG. 4 is a partial enlarged view of a bar region B according to the present invention.

FIG. 4 is a partial enlarged view of the bar region B according to the present invention. When the electron beam is applied to the reference line SL, the exposure position correction region R undergoes correction and the electron beam is thus applied to the reference line SL'. In this case, since there is one exposure position correction region R (see FIGS. 3A to 3C), patterns MRE of a plurality of MR elements which are lined up in a row on the reference line are essentially exposed so as to be lined up in a row.

Therefore, when a bar region B is cut away from the wafer W and polishing is performed under the condition that the bar region B should be polished uniformly in a direction perpendicular to the longitudinal direction of the bar region B, MR elements that possess a substantially uniform MR height are obtained for MR elements which are lined up substantially in a row. Note that the polishing direction is indicated by POD. A thin-film magnetic head for which the variation in characteristics is small can be obtained by processing these MR elements. Further, a cut face DL' is formed as a polished face DL, which is inwardly disposed, by means of polishing.

According to this MR element bar formation method, the resist thus exposed by the MR element bar exposure method is developed, and the MR element patterns MRE are formed by using the mask constituted by the developed resist. This resist is an electron beam resist and hence a high resolution exposure pattern can be formed.

The patterns MRE can be formed by forming a magneto-resistance effect film on the wafer W, and then coating this film with a resist, and exposing and developing the resist so that a plurality of shields remain. Thereafter, after performing etching so that the magneto-resistance effect film is removed in areas other than directly below the residual resist, the resist is peeled or lifted off, whereby MR elements lined up in a row are formed on the reference line. These MR elements are substantially the same shape as the patterns MRE.

Further, as the MR element formation method, a method which forms MR elements lined up in a row by performing exposure and development by means of the above method so as to form a resist pattern having a plurality of openings on the wafer W, and then deposits an MR film on the resist and lifts off the resist so that the plurality of MR elements remains only in part may also be considered.

After the MR elements (the patterns MRE) lined up in a row have been thus formed, the MR element bar (B) is cut away from the wafer W. Next, the cut faces parallel to the longitudinal direction of the MR element bar are polished. After the polishing, the MR elements are divided and processed into thin-film magnetic heads. In this case, because MR elements that possess a substantially uniform MR height are obtained after polishing, a variation in the head characteristics can be suppressed.

The MR element bar fabricated by this method is such that, in an MR element bar that comprises a plurality of MR elements arranged in the longitudinal direction of the bar, the interval between neighboring MR elements in the thickness direction of the MR element bar and in a direction perpendicular to the longitudinal direction thereof is equal to or less than 0.05 μm.

In this case, because the interval from the parallel faces in the longitudinal direction of the MR element bar to the neighboring MR elements is equal to or less than 0.05 μm, if polishing is performed under the condition that MR elements lined up substantially in a row should be polished uniformly, MR elements that possess a substantially uniform MR height may be obtained. Thin-film magnetic heads for which the variation in characteristics is small can be obtained by processing these MR elements. That is, because the distance from the cut face DL to the center of the MR elements is equalized, the MR height is also equalized, whereby a variation in characteristics between one MR element and the next can be suppressed.

Figure 5:
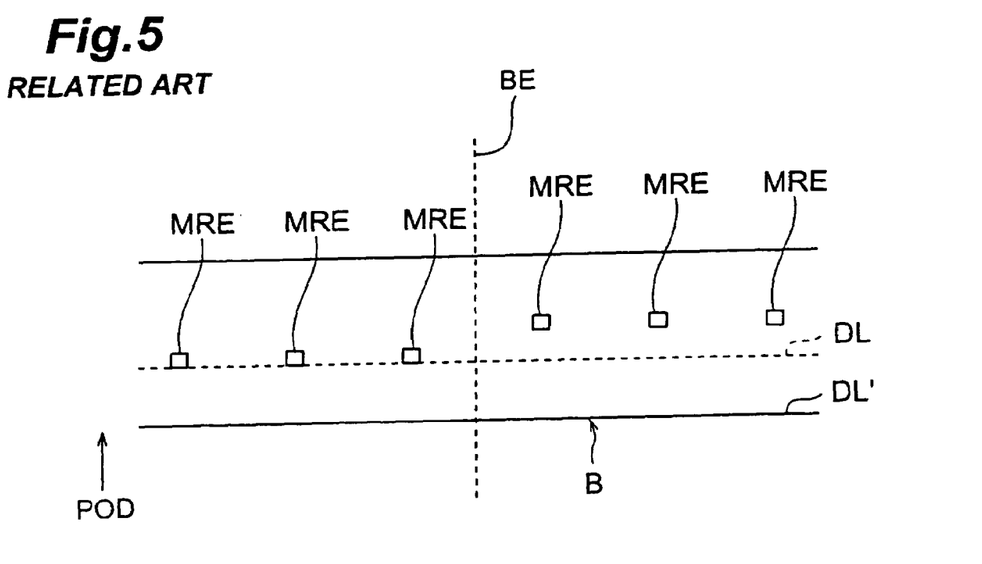
FIG. 5 is a partial enlarged view of a bar region B according to the conventional example.

FIG. 5 is a partial enlarged view of a bar region B according to a conventional example. When an electron beam is applied to the reference line SL, correction is carried out for the exposure position correction regions R10 and R20 such that the electron beam is applied to the reference line SL'. In this case, because there are two exposure position correction regions R10 and R20, the MR element patterns MRE are separated in the polishing direction POD at the boundary BE between the exposure position correction regions R10 and R20.

Therefore, when the bar region B is cut away from the wafer W and the cut face DL' is polished, the distance from the polished face DL to the MR element patterns MRE is different. In this case, the interval in the polishing direction between neighboring MR element patterns MRE exceeds 0.05 μm and hence there is a variation in the element characteristics.

As described above, the MR element bar exposure method according to the embodiment above is an MR element bar exposure method that comprises the steps of: detecting the positions of a plurality of alignment marks $P_1$ to $P_4$ formed on the wafer W; correcting the exposure position correction region R on the basis of the positions of the detected alignment marks $P_1'$ to $P_4'$; and exposing a resist which is coated on the wafer W, wherein the MR element bar region B comprises a plurality of MR elements (patterns MRE) aligned in the longitudinal direction of the region B, and one exposure position correction region R is established for one MR element bar region B.

Although the positions of the MR elements (patterns MRE) are determined by the resist exposure points, when the exposure position correction region that serves as a reference for prescribing the exposure point positions is established in a quantity of two or more for one bar region, because the reference for prescribing the exposure point positions is different for these two exposure position correction regions, the MR height after polishing is different. That is, the variation in the characteristics of the MR elements and thin-film magnetic heads is then large.

Because, according to the present embodiment, one exposure position correction region R is established for one MR element bar region B, there is a single reference for prescribing the exposure point positions, and therefore the MR height prescribed by the polished face DL is substantially consistent.

In order to raise the recording density of magnetic recording media, a finer track width for writing by the recording head and a finer track width for reading by the playback head are absolutely essential. For this reason, conventionally, in the photolithographic process for the processing of minute MR elements, a light source of a short wavelength represented by ultraviolet (365 nm), KrF(248 nm), or ArF(193 nm), for example, is adopted as the light source of the exposure device, whereby the resolution is raised. Therefore, an ultraviolet or gamma ray light source can also be used in place of an electron beam in the exposure described above. However, an electron beam is preferably employed from the standpoint of resolution. Further, when there is a resist which is sensitive to laser light, laser light can also be used instead of the electron beam.

The control method for the above exposure device will now be described.

The exposure device comprises a drive system S for shifting the wafer W, which is coated with a resist sensitive to beam exposure and from which the MR element bar (B) is cut, in a direction within the substrate plane; an electron gun E for applying a beam to the wafer W; a deflector coil M which is the beam shifting means for shifting the beam to the desired position on the wafer W; and a control system C for controlling the drive system S and the deflector coil M. The 'beam shifting means' in a case of electron beam exposure denotes the deflector coil M that is capable of deflecting the beam to a region of a certain limited size on the wafer W.

Figure 6A:
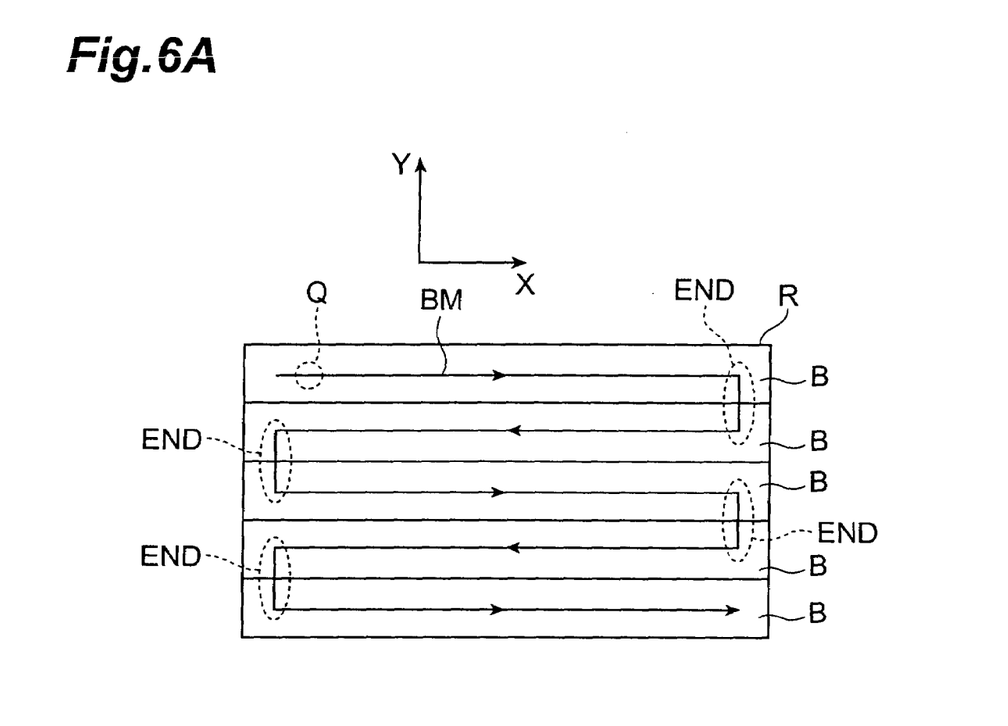
FIG. 6A provides a planar view of an exposure position correction region.
Figure 6B:
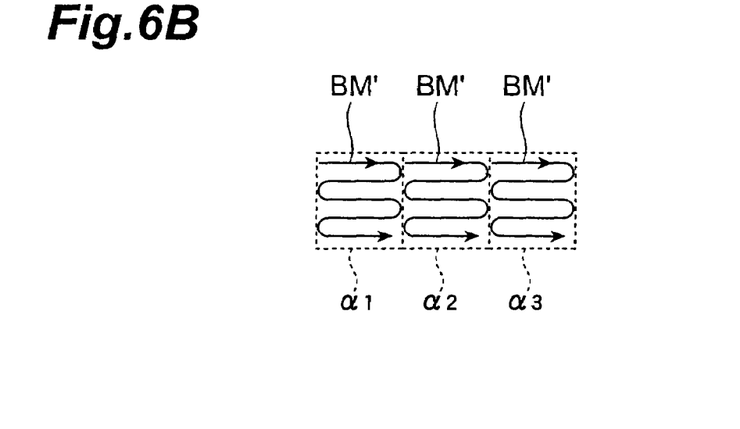
FIG. 6B provides an enlarged view of a region Q.

FIG. 6A is a planar view of the exposure position correction region, and FIG. 6B is an enlarged view of the region Q in FIG. 6A.

During exposure of the wafer W, the control system C controls the drive system S so that the wafer W is shifted only in the longitudinal direction of the MR element bar and is shifted in a direction perpendicular to the longitudinal direction of the bar (polishing direction: ±Y) only at the exposure end END.

Referring now to FIG. 6A, the wafer W is shifted in the X direction by the drive system S and meanwhile a beam exposure spot BM which is deflected by the deflector coil M is scanned over the wafer W. Here, the control system C also controls the timing with which the electron beam emitted by the electron gun E is applied and the magnitude of the electron beam. At the exposure end END, the wafer W is shifted by the drive system S in the Y direction and then the BM is similarly scanned over the wafer W while the wafer W is shifted in the X direction. This beam exposure is intermittent and the MR element patterns are formed one right after the other during the exposure. Although the scanning in the X direction is performed once for one MR element bar in FIG. 6A, this scanning may be carried out a plurality of times. Alternatively, one scan may be performed for a plurality of MR element bars. Here, the beam exposure spot BM as viewed from a microscopic standpoint is constituted by microscopic spot BM' scans.

Referring now to FIG. 6B, after the minute spot BM' is scanned within the minute range α1 by the deflector coil M, scanning is performed within the adjoining minute range α2, and then within the minute range α3. Here, the minute spot BM' is also constituted by microscopic spot scans.

In the MR element exposure, although the wafer W is shifted in the X direction by the drive system S and meanwhile the beam exposure spot BM which is deflected by the deflector coil M is scanned over the wafer W, the beam position control accuracy achieved by the deflector coil M is higher than the accuracy with which the position of the wafer W is controlled by the drive system S, and hence the range of motion given the same accuracy is small.

During exposure by this device, other than at the exposure end, the wafer W is not shifted by the drive system S in the direction (Y direction) perpendicular to the longitudinal direction of the MR element bar B, and therefore shifting errors in the Y direction made by the drive system S are suppressed. For example, in a case where the minute range α2 is scanned after scanning the minute range α1, the wafer W may be shifted in the X direction through control of the drive system S. Because the wafer W is not shifted in the perpendicular direction during exposure of the MR elements lined up in a row in the longitudinal direction, positional accuracy in the perpendicular direction is then favorable.

On the other hand, the whole surface of the wafer W can be sequentially exposed with the positional accuracy of the patterns MRE in the MR element bar in the perpendicular direction unaffected as a result of the wafer W being shifted by the drive system in the perpendicular direction only at the exposure end END.

GMR (Giant Magneto Resistive) elements and TMR (Tunnel Magneto Resistive) elements and the like may be cited as examples of thin-film magnetic heads that employ the above-described MR elements.

Further, as far as the structure of the thin-film magnetic heads is concerned, the present invention can be applied to a CPP (Current Perpendicular to Plane) structure in which electrons flow in the thickness direction of the free magnetic layer, and a CIP (Current In Plane) structure in which the current flows within a plane perpendicular to the thickness direction. Although NiFe is representative of a material that exhibits the magneto-resistance effect, a material with spin valves and a multi-layer film material that exhibits the magneto-resistance effect can be used. Further, variable beam forming or similar can also be used as the above-described electron beam exposure method.

According to the present invention, it is possible to provide an MR element bar that permits the fabrication of MR elements in which a variation in characteristics is suppressed, as well as an MR element bar exposure method and formation method enabling the fabrication of the MR element bar.

What is claimed is:

1. A magneto-resistance effect element bar exposure method comprising the steps of:
   detecting the positions of a plurality of alignment marks formed on a substrate;
   correcting an exposure position correction region on the basis of the positions of the detected alignment marks; and
   exposing a resist that is coated on the substrate,
   wherein a magneto-resistance effect element bar region comprises a plurality of magneto-resistance effect elements arranged in the longitudinal direction of the bar region; and
   a single exposure position correction region is established for one magneto-resistance effect element bar region.

2. The magneto-resistance effect element bar exposure method according to claim 1,
   wherein one magneto-resistance effect element bar region does not straddle the boundary of the exposure position correction region.

3. The magneto-resistance effect element bar exposure method according to claim 1,
   wherein the exposure is electron beam exposure.

4. A magneto-resistance effect element bar formation method, comprising the steps of:
   developing a resist exposed by means of the magneto-resistance effect element bar exposure method according to claim 1;
   forming a magneto-resistance effect element pattern by using a mask constituted by the developed resist;
   cutting the magneto-resistance effect element bar from the substrate; and
   polishing the cut faces parallel to the longitudinal direction of the magneto-resistance effect element bar.

5. The magneto-resistance effect element bar exposure method according to claim 1, wherein a distance between neighboring magneto-resistance effect elements in a thickness direction of the magneto-resistance effect element bar and in a direction perpendicular to the longitudinal direction thereof is equal to or less than 0.05 µm.

* * * * *